June 5, 1956 W. POULIART 2,749,540

IMPULSE REGISTER-TRANSLATOR ARRANGEMENT

Filed Jan. 17, 1952 6 Sheets-Sheet 1

Inventor
W. POULIART
By Robert Harding Jr.
Attorney

IMPULSE REGISTER-TRANSLATOR ARRANGEMENT

Filed Jan. 17, 1952 6 Sheets-Sheet 2

| N | Isr | Ar | Arr | Br | Brr | Cr | Crr | Dr | Drr | A | B | C | D |
|---|---|---|---|---|---|---|---|---|---|---|---|---|---|
| (IDLE) | − | − | − | − | − | − | − | − | − | 00 | 00 | 00 | 00 |
| (START) | + | + ++ | | + ++ | | + ++ | | + ++ | | 10 | 10 | 10 | 10 |
| 1 | − | | + | | | | | | | 11 | | | |
| | + | − | | | + | | | | | 01 | 11 | | |
| 2 | − | | − | | | | | | | 00 | | | |
| | + | + ++ | | − | | | + | | | 10 | 01 | 11 | |
| 3 | − | | + | | | | | | | 11 | | | |
| | + | − | | | − | | | | | 01 | 00 | | |
| 4 | − | | − | | | | | | | 00 | | | |
| | + | + ++ | | + ++ | | − | | | + | 10 | 10 | 01 | 11 |
| 5 | − | | + | | | | | | | 11 | | | |
| | + | − | | | + | | | | | 01 | 11 | | |
| 6 | − | | − | | | | | | | 00 | | | |
| | + | + ++ | | − | | | − | | | 10 | 01 | 00 | |
| 7 | − | | + | | | | | | | 11 | | | |
| | + | − | | | − | | | | | 01 | 00 | | |
| 8 | − | | − | | | | | | | 00 | | | |
| | + | + ++ | | + ++ | | + ++ | | − | | 10 | 10 | 10 | 01 |
| 9 | − | | + | | | | | | | 11 | | | |
| | + | − | | | + | | | | | 01 | 11 | | |
| 0 (10) | − | | − | | | | | | | 00 | | | |
| | + | + ++ | | − | | | + | | | 10 | 01 | 11 | |

FIG. 2.

Inventor
W. POULIART
By Robert Harding Jr.
Attorney

June 5, 1956 W. POULIART 2,749,540

IMPULSE REGISTER-TRANSLATOR ARRANGEMENT

Filed Jan. 17, 1952 6 Sheets-Sheet 3

Inventor
W. POULIART
By Robert Harding Jr.
Attorney

June 5, 1956 W. POULIART 2,749,540

IMPULSE REGISTER-TRANSLATOR ARRANGEMENT

Filed Jan. 17, 1952 6 Sheets-Sheet 4

*Inventor*

W. POULIART

By Robert Harding Jr.

*Attorney*

| T | U | A | B | C | D | E | F | G | N |
|---|---|---|---|---|---|---|---|---|---|
| 1 | | 10 | 01 | 11 | 01 | 11 | 10 | 10 | 10 |
| | 1 | 01 | 00 | | | | | | 11 |
| | 2 | 10 | 10 | 01 | 00 | | | | 12 |
| | 3 | 01 | 11 | | | | | | 13 |
| | 4 | 10 | 01 | 00 | | | | | 14 |
| | 5 | 01 | 00 | | | | | | 15 |
| | 6 | 10 | 10 | 10 | 10 | 01 | 11 | | 16 |
| | 7 | 01 | 11 | | | | | | 17 |
| | 8 | 10 | 01 | 11 | | | | | 18 |
| | 9 | 01 | 00 | | | | | | 19 |
| | 0 | 10 | 10 | 01 | 11 | | | | 20 |
| 2 | | 10 | 10 | 01 | 11 | 01 | 11 | 10 | 20 |
| | 1 | 01 | 11 | | | | | | 21 |
| | 2 | 10 | 01 | 00 | | | | | 22 |
| | 3 | 01 | 00 | | | | | | 23 |
| | 4 | 10 | 10 | 10 | 01 | 00 | | | 24 |
| | 5 | 01 | 11 | | | | | | 25 |
| | 6 | 10 | 01 | 11 | | | | | 26 |
| | 7 | 01 | 00 | | | | | | 27 |
| | 8 | 10 | 10 | 01 | 00 | | | | 28 |
| | 9 | 01 | 11 | | | | | | 29 |
| | 0 | 10 | 01 | 00 | | | | | 30 |
| 3 | | 10 | 01 | 00 | 00 | 00 | 11 | 10 | 30 |
| | 1 | 01 | 00 | | | | | | 31 |
| | 2 | 10 | 10 | 10 | 10 | 10 | 01 | 11 | 32 |
| | 3 | 01 | 11 | | | | | | 33 |
| | 4 | 10 | 01 | 11 | | | | | 34 |
| | 5 | 01 | 00 | | | | | | 35 |
| | 6 | 10 | 10 | 01 | 11 | | | | 36 |
| | 7 | 01 | 11 | | | | | | 37 |
| | 8 | 10 | 01 | 00 | | | | | 38 |
| | 9 | 01 | 00 | | | | | | 39 |
| | 0 | 10 | 10 | 10 | 01 | 11 | | | 40 |
| 4 | | 10 | 10 | 10 | 01 | 11 | 01 | 11 | 40 |
| | 1 | 01 | 11 | | | | | | 41 |
| | 2 | 10 | 01 | 11 | | | | | 42 |
| | 3 | 01 | 00 | | | | | | 43 |
| | 4 | 10 | 10 | 01 | 00 | | | | 44 |
| | 5 | 01 | 11 | | | | | | 45 |
| | 6 | 10 | 01 | 00 | | | | | 46 |
| | 7 | 01 | 00 | | | | | | 47 |
| | 8 | 10 | 10 | 10 | 10 | 01 | 00 | | 48 |
| | 9 | 01 | 11 | | | | | | 49 |
| | 0 | 10 | 01 | 11* | | | | | 50 |
| 5 | | 10 | 01 | 11 | 10 | 01 | 00 | 11 | 50 |
| | 1 | 01 | 00 | | | | | | 51 |
| | 2 | 10 | 10 | 01 | 11 | | | | 52 |
| | 3 | 01 | 11 | | | | | | 53 |
| | 4 | 10 | 01 | 00 | | | | | 54 |
| | 5 | 01 | 00 | | | | | | 55 |
| | 6 | 10 | 10 | 10 | 01 | 00 | | | 56 |
| | 7 | 01 | 11 | | | | | | 57 |
| | 8 | 10 | 01 | 11 | | | | | 58 |
| | 9 | 01 | 00 | | | | | | 59 |
| | 0 | 10 | 10 | 01 | 00 | | | | 60 |

| T | U | A | B | C | D | E | F | G | N |
|---|---|---|---|---|---|---|---|---|---|
| 6 | | 10 | 10 | 01 | 00 | 00 | 00 | 11 | 60 |
| | 1 | 01 | 11 | | | | | | 61 |
| | 2 | 10 | 01 | 00 | | | | | 62 |
| | 3 | 01 | 00 | | | | | | 63 |
| | 4 | 10 | 10 | 10 | 10 | 10 | 10 | 01 | 64 |
| | 5 | 01 | 11 | | | | | | 65 |
| | 6 | 10 | 01 | 11 | | | | | 66 |
| | 7 | 01 | 00 | | | | | | 67 |
| | 8 | 10 | 10 | 01 | 11 | | | | 68 |
| | 9 | 01 | 11 | | | | | | 69 |
| | 0 | 10 | 01 | 00 | | | | | 70 |
| 7 | | 10 | 01 | 00 | 11 | 10 | 10 | 01 | 70 |
| | 1 | 01 | 00 | | | | | | 71 |
| | 2 | 10 | 10 | 10 | 01 | 11 | | | 72 |
| | 3 | 01 | 11 | | | | | | 73 |
| | 4 | 10 | 01 | 11 | | | | | 74 |
| | 5 | 01 | 00 | | | | | | 75 |
| | 6 | 10 | 10 | 01 | 00 | | | | 76 |
| | 7 | 01 | 11 | | | | | | 77 |
| | 8 | 10 | 01 | 00 | | | | | 78 |
| | 9 | 01 | 00 | | | | | | 79 |
| | 0 | 10 | 10 | 10 | 10 | 01 | 11 | | 80 |
| 8 | | 10 | 10 | 10 | 10 | 01 | 11 | 01 | 80 |
| | 1 | 01 | 11 | | | | | | 81 |
| | 2 | 10 | 01 | 11 | | | | | 82 |
| | 3 | 01 | 00 | | | | | | 83 |
| | 4 | 10 | 10 | 01 | 11 | | | | 84 |
| | 5 | 01 | 11 | | | | | | 85 |
| | 6 | 10 | 01 | 00 | | | | | 86 |
| | 7 | 01 | 00 | | | | | | 87 |
| | 8 | 10 | 10 | 10 | 01 | 00 | | | 88 |
| | 9 | 01 | 11 | | | | | | 89 |
| | 0 | 10 | 01 | 11 | | | | | 90 |
| 9 | | 10 | 01 | 11 | 01 | 00 | 11 | 01 | 90 |
| | 1 | 01 | 00 | | | | | | 91 |
| | 2 | 10 | 10 | 01 | 00 | | | | 92 |
| | 3 | 01 | 11 | | | | | | 93 |
| | 4 | 10 | 01 | 00 | | | | | 94 |
| | 5 | 01 | 00 | | | | | | 95 |
| | 6 | 10 | 10 | 10 | 10 | 10 | 01 | 00 | 96 |
| | 7 | 01 | 11 | | | | | | 97 |
| | 8 | 10 | 01 | 11 | | | | | 98 |
| | 9 | 01 | 00 | | | | | | 99 |
| | 0 | 10 | 10 | 01 | 11 | | | | 100 |
| 0 (10) | | 10 | 10 | 01 | 11 | 10 | 01 | 00 | 100 |
| | 1 | 01 | 11 | | | | | | 101 |
| | 2 | 10 | 01 | 00 | | | | | 102 |
| | 3 | 01 | 00 | | | | | | 103 |
| | 4 | 10 | 10 | 10 | 01 | 11 | | | 104 |
| | 5 | 01 | 11 | | | | | | 105 |
| | 6 | 10 | 01 | 11 | | | | | 106 |
| | 7 | 01 | 00 | | | | | | 107 |
| | 8 | 10 | 10 | 01 | 00 | | | | 108 |
| | 9 | 01 | 11 | | | | | | 109 |
| | 0 | 10 | 01 | 00 | | | | | 110 |

FIG. 8.

Inventor
W. POULIART
By Robert Harding Jr.
Attorney

IMPULSE REGISTER-TRANSLATOR ARRANGEMENT

Inventor
W. POULIART
By Robert Harding Jr.
Attorney

Patented June 5, 1956

2,749,540

IMPULSE REGISTER-TRANSLATOR ARRANGEMENT

Willy Pouliart, Antwerp, Belgium, assignor to International Standard Electric Corporation, New York, N. Y., a corporation of Delaware Application January 17, 1952, Serial No. 266,832

Claims priority, application Netherlands February 20, 1951

4 Claims. (Cl. 340—347)

The invention relates to an impulse register-translator arrangement and more particularly to an electric device for directly recording, in the binary scale, a number delivered thereto in the form of one or more series of impulses.

The object of the invention resides in the provision of binary recording means for directly recording series of impulses characterising a number of one or more digits in an arbitrary scale different from the binary scale, so arranged as to avoid first recording said number in its original scale and translating it afterwards into the binary scale. In this manner, the recording means will operate as a register-translator, thus combining both functions.

A feature of the invention resides in an electric unit with an input and an output and means to apply N cycles, hereafter called impulses, of two successive and different signals, e. g. ground and absence of ground, with a repetition-rate T, to said input, thereby causing the unit to deliver at its output $$\frac{N}{2}$$

output impulses with a repetition-rate 2T.

Another feature of the invention resides in the combination of $n$ electric units forming a chain and means to apply N impulses to the input of the first unit in the chain whereby each unit will deliver $$\frac{N}{2^r}$$

output impulses with a repetition-rate $2^r$T, where $r(1\leqslant r\leqslant n)$ defines the position of the unit in said chain.

Another feature of the invention resides in the fact that each of said electric units has two stable electrical conditions and changes from one to another in response to an impulse applied to its input, whereby a chain of such electric units will provide means for recording the number N in the binary scale.

Another feature of the invention resides in a chain of electric units to which a plurality $t$ of impulses series of $N_1$, $N_2$, . . . $N_x$, . . . $N_t$ (where $\leqslant x\leqslant t$) characterizing the number $$N(N=N_1s^{t-1}+N_2s^{t-2}+\ .\ .\ .\ +N_xs^{t-x}+\ .\ .\ .\ +N_t)$$

may be successively applied whereby the number N will be recorded on said chain in the binary scale, $s$ being the original scale of said number and $t$ being the number of digits in said scale $s$.

Figure 1:
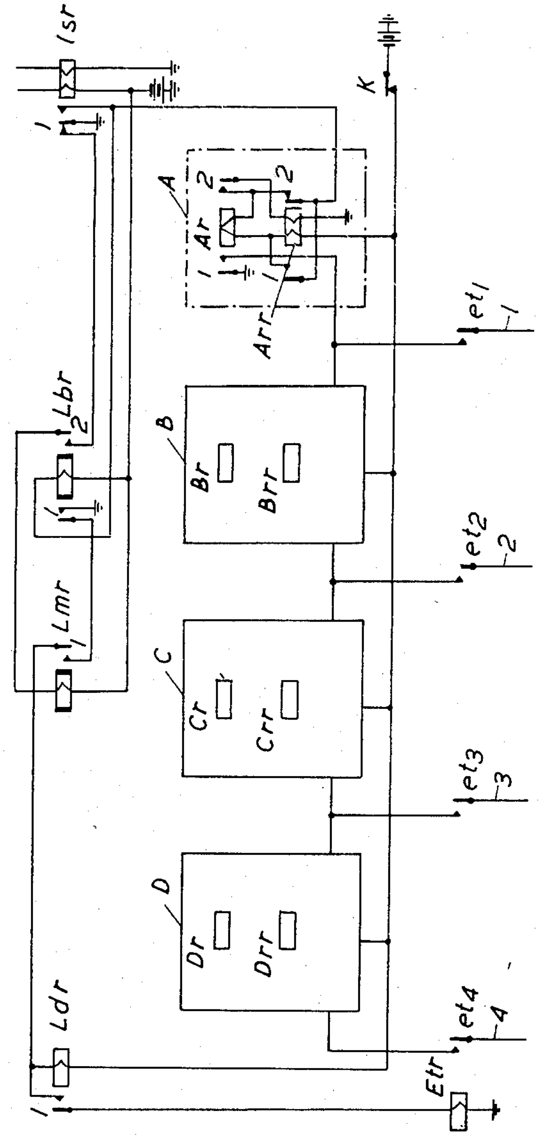
Figure 3:
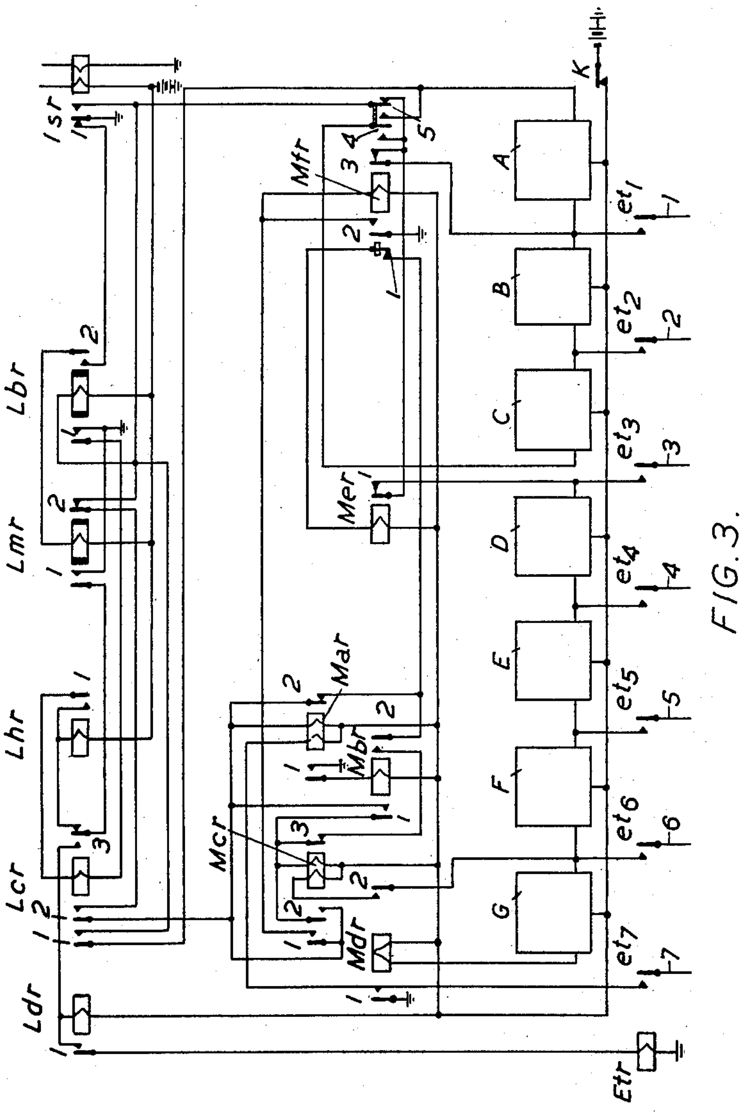
Figure 6:
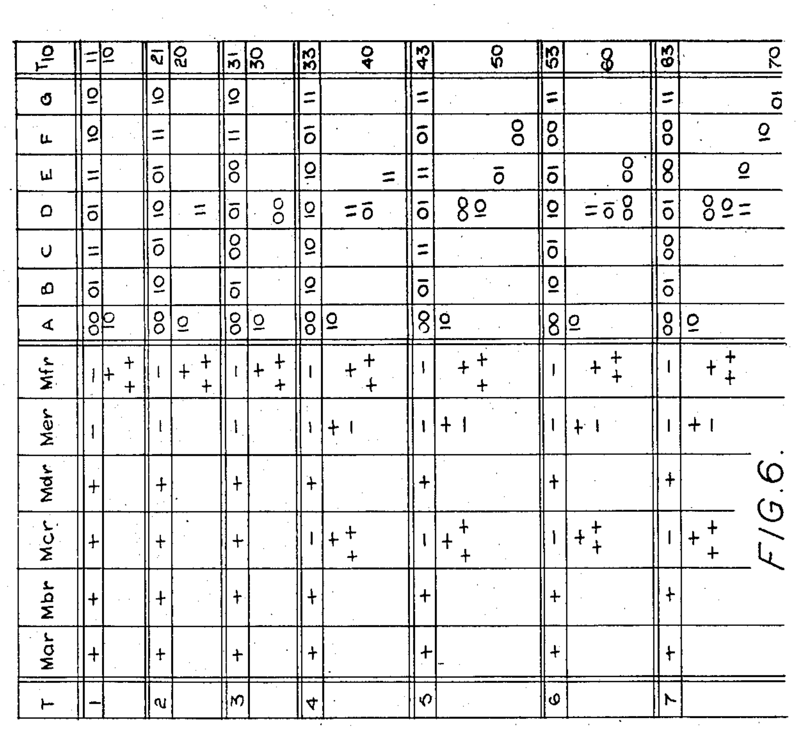
Figure 4:
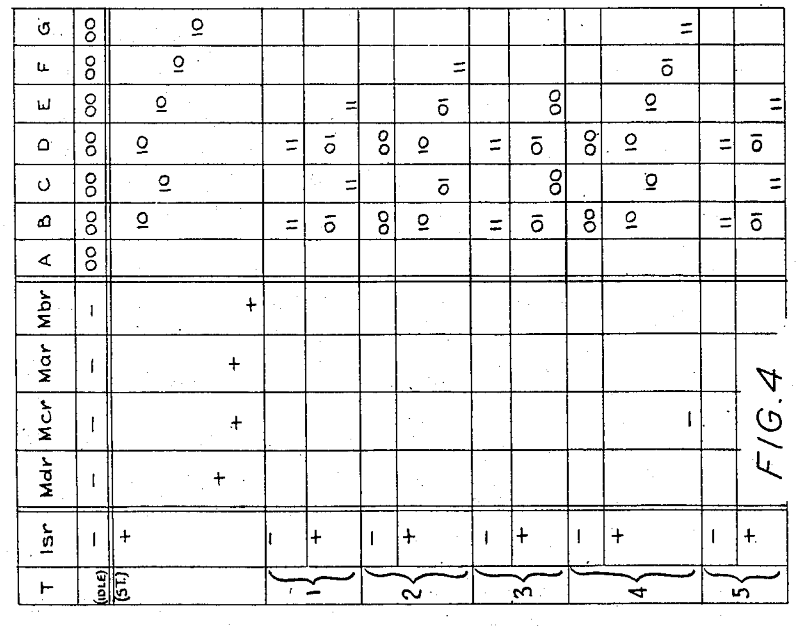
Figure 7:
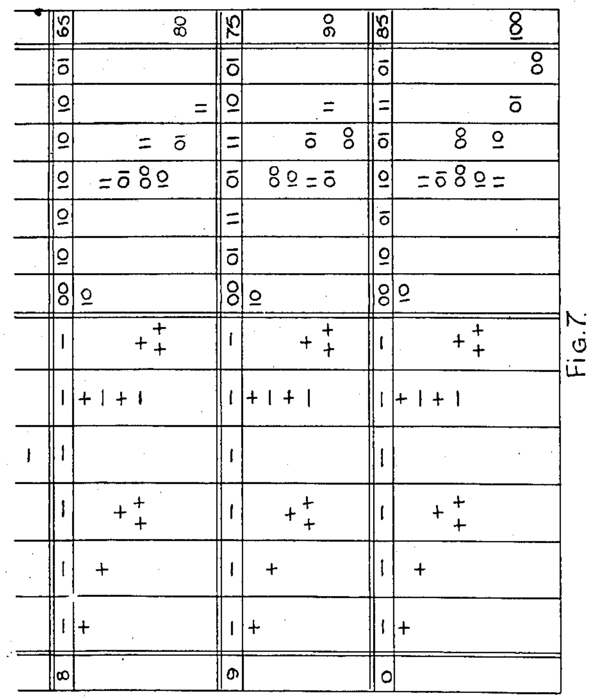
Figure 9:
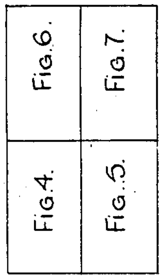
Figure 5:
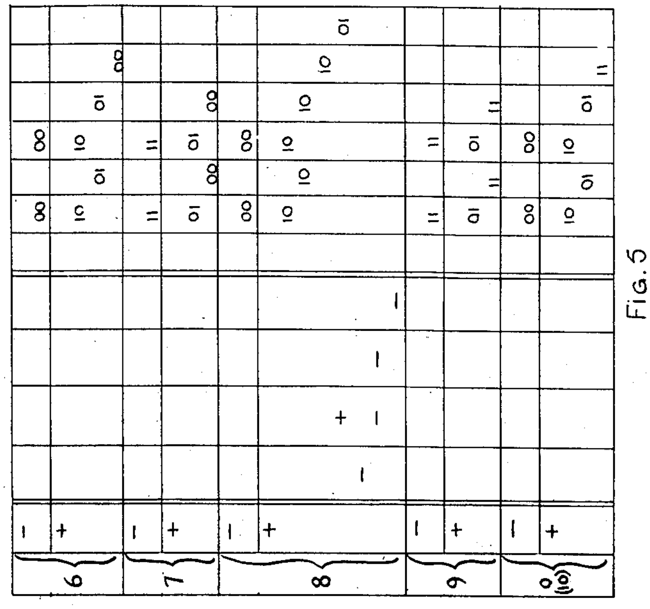

The above mentioned and other objects and features of the invention will become more apparent and the invention itself will be best understood by referring to the following description of embodiments taken in conjunction with the accompanying drawings which represent:

Fig. 1, a schematic representation of an embodiment of an electromagnetic binary recording chain for directly recording a single series of successive impulses;

Fig. 2, a schematic table of the switching operations occurring during the reception of a plurality of impulses in the circuit of Fig. 1;

Fig. 3, a schematic representation of an embodiment of an electromagnetic recording chain for directly recording two series of successive impulses;

Figs. 4 and 5, a schematic table of the switching operations occurring during the reception of the first series of impulses in the circuit of Fig. 3;

Figs. 6 and 7, a schematic table of the switching operations which occur during the interval between the two series of impulses in the circuit of Fig. 3;

Fig. 8, a schematic table of the switching operations occurring during the reception of the second series of impulses in the circuit of Fig. 3;

Fig. 9, the manner in which Figs. 4, 5 and 6, 7 should be read.

The embodiment of the invention which has been shown in Fig. 1 is in reference to a telephone system in which it is desirable to record, in the binary scale, a plurality of one to ten successive impulses received from a subscriber's calling dial. Such a requirement is frequently met in telephone systems, more particularly those including registers, and an example of binary recording may be found in the U. S. Patent No. 2,610,255, issued September 9, 1952. In this patent, however, the impulses of each series of received impulses are first recorded, still in the decimal scale, by means of step-by-step switches and are afterwards translated onto a set of four registering relays which thereby record the number of impulses in the binary scale.

Other arrangements are also known in which the impulses of a decimal series are directly recorded in the binary scale by means of a set of four registering relays, plus auxiliary equipment. Such arrangements are, for example, to be found in the French Patent No. 944,572, issued August 8, 1951. The auxiliary equipment is, however, rather complicated and the speed of the recording is not very great.

Referring to Fig. 1, a set of four electric units are shown by A, B, C and D, the first alone having been represented in detail, the remaining three having been shown by block diagrams, since these units are all identical. Unit A is shown to comprise two relays A*r* and A*rr* and the remaining units will therefore comprise similar relays such as B*r* and B*rr* for unit B. The input conductor for unit A is controlled by a contact of an impulse receiving relay I*sr* which is a standard feature of telephone systems and for which a circuit is normally closed from battery to ground via its two windings in series aiding and the loop of the calling subscriber's line. As soon as this loop (not shown) is closed, relay I*sr* will therefore energize and besides applying ground to the input conductor of unit A via make contact $is_1$, it will at the same time supply ground to one end of the winding of slow release relay L*br* which will therefore energize. At the first break of the loop, during the first dial impulse sent by the calling subscriber, relay I*sr* will release and therefore a circuit will be established from ground, via break contact $is_1$, make contact $lb_2$ and winding of slow release relay L*mr* to battery, whereby relay L*mr* will energize. Since relay L*br* is slow to release and since the opening of the loop and therefore the release of relay I*sr* are only momentary, if other dial impulses follow, relay L*br* has no opportunity to release.

Similarly, at the subsequent reclosure of the loop and the corresponding re-energization of relay I*sr*, the duration of the opening of break contact $is_1$ will not be sufficient to cause the release of the slow release relay L*mr*. These relays which constitute a standard feature in telephone systems will therefore remain energized during the reception of a series of dial impulses and as soon as both are energized, relay L*dr* will operate from battery supplied via break contact *k*, via winding of relay L*dr* and make contacts $lm_1$ and $lb_1$ to ground.

When a series of dial impulses has been completed, relay I*sr* will be left in an energized condition whereby relay L*mr* will release. In this manner, relay E*tr*, the winding of which provided a holding circuit via make contact $ld_1$ for relay L*dr*, will now become energized in series with relay L*dr* due to the disappearance of ground via make contact $lm_1$.

The function of this relay E*tr* is to apply marked electrical conditions to conductors 1–4 after the number of dial impulses in the received series has been recorded in the binary scale on the four units A–D, whereby the recorded binary number may be read and utilized for any desired purpose.

Referring now to the manner in which the units A–D are operated during the reception of impulses, Fig. 2 shows a schematic table detailing the various switching operations. The first column (N) refers to the number of impulses which may be received, the second column (I*sr*) indicates the successive changes in the electrical condition of impulse relay I*sr*, which changes have been indicated by "+" when the relay becomes energized and by "−" when the relay releases. The same convention will be applied for all relays and further, the sign "++" will refer to a holding circuit being established for a relay. Columns 3–10 of the table show the various changes in the electrical conditions of the relays included in the four units A–D, while the last four columns of the table refer to changes in the electrical conditions of the units A–D. These conditions are referred to by means of two-digit numbers, i. e. 00, 10, 11, 01 which respectively indicate, e. g. for unit A, that both relays A*r* and A*rr* are now deenergized, relay A*r* is energized alone, both relays are energized, and relay A*rr* is energized alone.

For ease of understanding, the columns for the various relays as well as those for the various units have been arranged so that a change in the electrical condition of a relay or a unit will be found in a column located to the right of the column in which has been indicated the change in the electrical condition of the relay or unit which caused this resulting change. Also, the resulting change will be indicated in a row immediately below the row in which has been indicated the preceding change in the electrical condition causing said resulting change.

Referring to Fig. 1, as soon as relay I*sr* energizes, relay A*r* is energized from battery supplied via break contact *k*, via left-hand winding of relay A*rr*, winding of relay A*r*, break contact $ar_2$ and make contact $is_1$ to ground. The current flowing in this circuit is, however, not sufficient to cause the energization of relay A*rr*. A holding circuit for relay A*r* is provided via make contact $a_2$ and right-hand winding of relay A*rr*, to ground. At the first break of the loop, i. e. at the beginning of the first impulse, relay I*sr* releases and accordingly the short-circuit on the right-hand winding of relay A*rr* is removed whereby this relay operates via its two windings in series with relay A*r*. At the subsequent reclosure of the loop, i. e. at the end of the first impulse, relay I*sr* is re-energized and will now supply ground via make contacts $is_1$ and $ar_1$ in such a manner that the winding of relay A*r* being short-circuited, relay A*r* releases while relay A*rr* is held by its left-hand winding only. At the second break of the loop, relay A*rr* will obviously release and unit A will be brought back to its initial rest condition. The above mentioned operations can be easily followed on the table shown in Fig. 2, in the first four columns.

As soon as relay A*r* is energized, it will supply ground via its make contact $a_1$ to the output conductor leading out from unit A. Accordingly, it is obvious that contact $a_1$ will act on unit B in the same manner as contact $is_1$ on unit A and a similar remark applies for the remaining units in the chain. It will be noted, however, that for every two impulses supplied to unit A by contact $is_1$, unit B will only be supplied with one impulse from contact $a_1$. In a general manner, it can be said that for N impulses supplied to the first unit of the chain, i. e. unit A, each remaining unit will deliver $$\frac{N}{2r}$$

impulses, where $r(1\leqslant r\leqslant n)$ defines the position of the unit in said chain, e. g. $r=1$ refers to the first unit, and $n$ being the number of units in the chain, i. e. 4 for the circuit of Fig. 1. It will, therefore, be evident that when the said N impulses have been delivered to and recorded upon the chain, the electrical conditions applied to the output conductors of the several units thereof can be used to represent the values of the digits of the number N in binary notation, the output of unit A indicating the value of the digit of lowest denomination $2^0$, that of unit B the value of the digit of denomination $2^1$, and so on.

Owing to the fact that the electrical condition applied to the output of each unit is solely dependent upon the electrical condition of one of the two relays therein, e. g. relay A*r*, it will be evident that only the first digits of the two-digit numbers shown in the last four columns of Fig. 2, will be significant of the said values.

In the manner described above, as soon as relay I*sr* is energized for the first time, the energization of relay A*r* will be followed by the energization of relay B*r* and so on until relay D*r* energizes and holds via the windings of its associated relay D*rr*. This is shown schematically in the upper part of the table of Fig. 2 and the remaining switching operations for the various relays of the units can be readily followed by means of this table up to a maximum number of ten impulses transmitted by the impulse relay I*sr*. For example, after seven impulses, relay I*sr* being again energized, relay A*r* is de-energized and its associated relay A*rr* is energized, relay B*r* and its associated relay B*rr* are de-energized, relay C*r* and its associated relay C*rr* are de-energized, relay D*r* and its associated relay D*rr* are energized. The conditions of the various units can be more readily expressed by reading from right to left the numbers in the last four columns of Fig. 2 corresponding to seven completed impulses, i. e. 11, 00, 00, 01. Since only the first digits of these numbers are significant, this can be read as 1000 which is an inverted representation of 0111, the binary equivalent of the decimal number 7, i. e. $2^2+2^1+2^0$. The "inversion" is expressly used since, owing to the pre-energization of the relays A*r*, B*r*, etc., when relay I*sr* was first energized, it is the absence of ground on a conductor such as 1 which will be characteristic, after the energization of relay E*tr*, of a digit 1 of the binary number which has been recorded, whereas the presence of ground thereon will be characteristic of the digit 0.

The cyclic operation of the units can be readily followed from the last four columns of Fig. 2. Each unit follows the cycle 10, 11, 01, 00 and if we call T the repetition-rate for the cycle followed by unit A, the rate for the cycle followed by unit B will be equal to 2T and so on, each unit following a cycle, the repetition-rate of which is equal to twice the rate of the cycle followed by the preceding unit in the chain.

Referring to the above example of the reception of seven impulses, when relay I*sr* is finally re-energized, relay L*mr* releases and relay E*tr* is energized whereupon ground potential will be applied to conductor 4 via make contact $et_4$ while no ground will be applied to conductors 1—3, whereby any device operating in binary manner can be actuated, bearing in mind however that the binary recording of the number seven is inverted. It will be evident, however, that this inverted binary recording can readily be converted to a direct binary recording by any means known in the art if desired.

While the circuit of Fig. 1 is adequate for the registration of 1 to 10 impulses, and may be easily modified to cope with the registration of any number of impulses, it may be required to record a plurality of series of impulses representing a number with a plurality of digits in any scale of notation. Since, e. g. in the case of two decimal series of impulses, the number of impulses in the first series represents a numerical value equal to ten times that represented by an equal number of impulses in the second series, the arrangement of Fig. 1 would not fulfil the purpose of recording in the binary scale any decimal number between 1 and 100.

The circuit of Fig. 3 which is a modification of the circuit shown on Fig. 1 fulfils that purpose and may, for example, be applied in telephone systems including switches each provided with 100 outlets, which switches are operated on a binary basis. Such switches are usually of the crossbar type and reference is made here to the British Patent No. 521,144, issued August 8, 1940, which describes a so-called permutation bar switch. In this switch, the permutation bars may each be controlled by a separate electro-magnet and can therefore occupy two positions. In this manner, using a combination of such permutation bars, means can be provided which are responsive to a particular combination of operated and non-operated bars and which means can therefore select a desired outlet. The number of such permutation bars is usually equal to 5, whereby the selection of one outlet out of a possible number equal to $2^5=32$ can be performed. In addition, two sets of servo magnets can also be used which will afford the possibility of selecting one outlet out of $2^2=4$, whereby in combination with the set of permutation bars, one out of a total number of $2^5 \times 2^2 (\times) = 2^7 = 128$ outlets can be selected, an arrangement which is therefore sufficient to cope with the selection of any desired outlet out of 100 possible outlets.

It will be seen that the circuit of Fig. 3, which includes seven units A–G all identical with unit A shown in Fig. 1, can provide means for controlling the selection of a 100-outlet switch operating on a binary basis. The circuit is essentially similar to that shown in Fig. 1, but two additional relays L*cr* and L*hr* have been used in combination with the relays L*br*, L*mr*, L*dr* and E*tr* already shown in Fig. 1 for the purpose of operating relay E*tr* only after two series of impulses, representing the "tens" and "units" digits of a two-digit decimal number, have been received. The respective functions of these relays L*cr* and L*hr* will become more apparent from a later part of this description. Also, a set of six relays M*ar*, M*br*, M*cr*, M*dr*, M*er* and M*fr* have been added to enable arrangement of Fig. 3 to cope with the reception of two series of impulses. Their respective functions will also become more apparent from a later part of this description.

If a two-digit decimal number is to be recorded in the binary scale on the chain A–G, it will be evident that the first digit, which is characterized by the number of impulses in the first series, will have to be recorded with a value equal to ten times the value which would normally be recorded if only one series of impulses were used.

It may be useful to remark here that in telephone systems and computor arrangements a decimal scale generally implies the use of ten impulses to characterize the digit "0" in a decimal number, owing to the preference for using positive rather than negative signals.

In recording the first series of impulses, use will be made of the property that any number is the sum of powers of 2. More particularly the number 10 in the decimal scale is equal to $2^3+2^1=8+2$. Using this property the circuit of Fig. 3 provides means for multiplying the first series of impulses by $10=2^3+2^1$ and this will be achieved by feeding the first series of impulses to units D and B simultaneously, instead of to unit A, and thereafter adding the recorded numbers on the chain in accordance with a well known principle. For this purpose, it is necessary to break the chain between the output of unit C and the input of unit D during the reception of the first series of impulses, and it will be observed that whereas unit D is followed by three units, i. e. E, F and G, unit B is followed by only one unit, i. e. C. Accordingly, while the four units D–G will provide adequate recording means for the first series of impulses, in the manner described with reference to Fig. 1, the two units B and C will not provide sufficient recording means for the first series of impulses.

This problem could be solved by temporarily connecting the output of unit C to two additional units D′ and E′ (not shown) but it is preferred not to use this method and instead, to apply a correction in order to cause the chain to record the proper number. This correction will be in the form of auxiliary impulses, a suitable number of these being fed into the chain at a suitable point therein. The number of corrective impulses to be sent after the first series of impulses has been recorded will be determined by the electrical condition of the relays M*ar*, M*br* and M*cr*, M*dr* being a helping relay to unit G. Relay M*er* is the auxiliary impulse relay, while M*fr* is used in relation to the temporarily interrupted connections between units C and D and between make contact $is_1$ and unit A, respectively.

The description of the circuit in Fig. 3 will be made with reference to schematic tables in the same manner as the table in Fig. 2 was used for the circuit in Fig. 1. In the case of Fig. 3, the switching operations occurring during the reception of the first series of impulses are tabulated as shown in Figs. 4 and 5. The first column (T) refers to the number of impulses in the first ("tens") series, while the second column (I*sr*) indicates the successive changes in the electrical condition of the impulse relay I*sr*. The next four columns relate to the changes in the electrical conditions of the relays M*dr*, M*cr*, M*ar* and M*br* which have been shown in that order so as to conform to the convention that the result of a change in the electrical condition of a relay, i. e. "+" or "–," is indicated by a change in the electrical condition of another relay in a column located to the right of the column in which the first mentioned changes is indicated. The last seven columns in Figs. 4 and 5 refer, in the same manner as the last four columns in Fig. 2, to the changes in the electrical conditions of the seven units A–G shown in Fig. 3. It is no longer necessary to detail the changes in the electrical conditions of the relays included in the various units since these are implicitly included in the notation used in the last seven columns of Figs. 4 and 5, which notation is the same as that used in the last four columns of the table in Fig. 2 and already described. It will be noted that the last four columns of Figs. 4 and 5 are identical with the last four of Fig. 2, and that columns B and C of Figs. 4 and 5 are identical with columns D and E.

Referring to Fig. 3, impulses transmitted by make contact $is_1$ will be delivered to unit B via break contacts $mf_5$ and $mf_3$ of relay M*fr*, and these impulses will also be simultaneously delivered to unit D via break contact $me_1$ of relay M*er*. As soon as relay I*sr* is energized, the units B and C, and the units D, E, F and G will all reach the condition 10 in the manner shown in the last six columns of Fig. 4. When unit G reaches the condition 10, it will supply ground at its output whereby relay M*dr* will be energized, the circuit extending to battery via break contact *k*. The energization of relay M*dr* will result in the operation of relay M*ar* via its left-hand winding and make contact $md_1$. Simultaneously, since unit F is also in the condition 10, ground will be applied to the left-hand winding of relay M*cr* via make contact $md_2$ whereby relay M*cr* will also be energized.

Finally, as a result of the energization of relay M*ar*, relay M*br* is energized via make contact $ma_1$. These operations are also shown schematically in Fig. 4. During the succeeding impulses of the first series, the electrical conditions of the various units will be modified as shown by the table in Figs. 4 and 5, without further affecting the relays $Mar$—$Mdr$, except at the completion of the fourth impulse, when unit F will be brought into condition 01 whereby the removal of ground at its output will cause the release of relay $Mcr$; at the completion of the eighth impulse, when unit F is changing to condition 10 will re-apply ground at its output, thereby re-energizing relay $Mcr$; and when, also as a result of the change of unit F to condition 10, unit G will be brought into condition 01 whereby relay $Mdr$ will release causing the subsequent release of relays $Mcr$, $Mbr$ and $Mar$.

It is to be noted that throughout the reception of the first series of impulses the input conductor of unit A is left disconnected and accordingly this unit will remain in its rest condition, i. e. 00.

The above changes in the conditions of relays $Mar$—$Mdr$ at the completion of the fourth and the eighth impulse of the first series, are utilized in order to compensate for the absence of third and fourth units in the incomplete chain B, C. It is evident that if the number of received impulses is 1, 2 or 3, it will be registered as twice that number by units B and C (which record digital values in the denominations $2^1$ and $2^2$, respectively), but if the number of impulses is 4, 5, 6 or 7, a correction of +1 in denomination $2^3$ will be necessary owing to the absence of the unit directly following C. In a similar manner, a correction of +1 in denomination $2^4$ will be necessary for a received number of 8, 9 or 10 impulses owing to the absence of the second unit following unit C.

As soon as the first series of impulses has been completed, the various units A–G will be in the conditions shown by the table in Figs. 6 and 7, in the row alongside the number of impulses received, which is indicated in the first column (T), as the case may be. For example, by reading the first digits of the seven two-digit numbers in columns A–G, it will be seen that the registered number characterizing the first series (tens) digit 1 will be 1110100 (reading from right to left) which is an inverted representation of 0001011, the binary equivalent of the decimal number $2^3+2^1+2^0=11$, as indicated in the last column $T_{10}$ of Figs. 6 and 7. Since the binary equivalent 0001010 of the decimal number 10 should in fact be registered, we have to apply a correction of −1 in denomination $2^0$. The error clearly results from the fact that unit A has been left in its rest condition 00, whereas all the remaining units reached the condition 10 at the first energization of relay $Isr$; it can readily be corrected by bringing unit A into the condition 10. The same correction will evidently have to be applied for T=2 and for T=3, since the numbers actually registered are the binary equivalents of 21 and 31, respectively, which are too high by 1.

In the case where the number of impulses in the first series is 4, 5, 6 or 7, a correction of +1 in unit D will have to be applied, as explained above, in addition to the correction of −1 in unit A. These operations are illustrated in the last eight columns of Figs. 6 and 7, from which it will be seen that in the case of T=4, the number registered before correction is 1011110, the "inverted" binary equivalent of 33, whereas after correction by $+2^3-2^0=7$, the number registered is 1010111, the desired "inverted" binary equivalent of 40.

In the same manner, where the number of impulses in the first series is 8, 9 or 10, the correction to be applied will be +1 in unit E and −1 in unit A. It will be appreciated from the foregoing description of the operation of the chain of units A–G that the correction of +1 in unit E can be effected either by supplying one additional impulse directly to unit E or by directing two additional impulses to unit D; in the circuit of Fig. 3 the latter method is used, as will be described hereafter. It may be noted that since the invention is described in connection with embodiments applicable to telephone systems, ten impulses have been designated by 0 in the first columns of Figs. 2, 5 and 7, to conform with telephone dial and directory practices.

Relays $Lbr$ and $Lmr$ shown in Fig. 3 operate in the same manner as the corresponding relays shown in Fig. 1, i. e. relay $Lbr$ energizes when make contact $is_1$ is closed for the first time and $Lmr$ energizes at the first subsequent release of relay $Isr$. Relay $Lmr$ will complete an operating circuit for relay $Lhr$ from ground via make contact $lm_1$ and break contact $lc_3$, winding of relay $Lhr$ to battery, whereupon the latter relay energizes and is locked in series with relay $Lcr$ via make contacts $lh_1$ and $lb_1$. In this circuit, however, relay $Lcr$ will only be permitted to energize in series with relay $Lhr$ when the ground supplied via make contact $lm_1$ and break contact $lc_3$ is removed. This will occur upon completion of the first series of impulses when relay $Isr$ energizes for a longer period and thereby causes the release of relay $Lmr$.

As soon as relay $Lcr$ energizes, it will apply ground via make contacts $is_1$ and $lc_1$ to the input of unit A whereby the latter will be brought into the condition 10 by the energization of relay $Ar$ therein. Ground will accordingly appear on the output of unit A, which is directly connected to the input of unit B; the change will, however, have no effect on the condition of unit B since the input of the latter is already grounded via break contacts $mf_3$, $mf_5$ and make contact $is_1$. This change in unit A is indicated in the table shown in Figs. 6 and 7 in each row immediately below the row characterizing the initial conditions of units A–G immediately after the impulses of the first series have been registered. Also, ground will be supplied via make contact $is_1$, break contact $lm_2$ and make contact $lc_2$ to that part of the circuit including the relays $Mar$—$Mdr$.

In the case where the number of impulses in the first series is 1, 2 or 3, this will merely cause the energization of relay $Mfr$ via make contact $mc_1$ since relay $Mcr$ is already operated. Relays $Mar$ and $Mcr$ will not be affected by this ground being connected to their right-hand windings since these windings are aiding with respect to the corresponding left-hand windings and since these relays are already energized. As soon as relay $Mfr$ is energized, it is locked to ground via its make contact $mf_2$, the input of unit D is disconnected from the make contact $is_1$ at break contact $mf_5$, and the output of the unit C is connected to the input of unit D via make contact $mf_4$ and break contact $me_1$. Also, the input of unit A is now permanently connected to the make contact $is_1$ via make contact $mf_5$ in preparation for the reception of the second (units) series of impulses, and the input of unit B is disconnected therefrom at break contacts $mf_3$ and $mf_5$. Thus, the effect of energizing relay $Mfr$ is to close the chain uniformly from unit A to unit G.

It will be appreciated that whereas for $T=1$ the only change in the chain is in unit A from condition 00 to 10, thus properly registering $T=1$ as 10, for $T=2$ or 3, the connection of unit C to unit D will cause a change in the condition of unit D, since whereas ground was formerly supplied to the input of this unit via make contact $is_1$ and break contacts $mf_5$ and $me_1$, this is now interrupted and since unit C is in condition 01 for $T=2$ and 00 for $T=3$, ground will no longer be supplied to the input of unit D. This will, however, not cause any significant modification of the condition of unit D, which is not required, but the condition will be modified from 10 to 11 ($T=2$) or from 01 to 00 ($T=3$) in preparation for further changes in the chain during the reception of the second series of impulses.

In the case of $T=4$, 5, 6 or 7, as mentioned above, it will be necessary to apply a correction of +1 in unit D in addition to the correction of −1 in unit A already dealt with, and this will be achieved owing to the fact that when ground is applied via make contact $lc_2$, relay $Mcr$ is in the released condition whereas relays $Mar$ and $Mbr$ are energized, as indicated in the second, third and fourth columns in Fig. 6. Accordingly, this ground will cause the operation of relay M*er*, which is the auxiliary impulse relay, via break contact $mf_1$, make contact $mb_2$, break contact $mc_3$ and make contact $mb_1$. Also, relay M*cr* energizes, via its right-hand winding and make contact $mb_1$ to the ground supplied via make contact $lc_2$, and locks at its make contact $mc_2$, whereupon relay M*er* will be returned to its released condition since its energizing circuit is interrupted at contact $mc_3$. Also, as previously mentioned, the energization of relay M*cr* will cause relay M*fr* to be energized via make contact $mc_1$ to the ground supplied via make contact $lc_2$, and relay M*fr* will lock at make contact $mf_2$ and perform the functions already described. In the meantime, the momentary energization of relay M*er* will have provided an impulse at break contact $me_1$ to the input of unit D causing the electrical condition of the latter to be significantly changed, e. g. for $T=4$, it will change from condition 10 via 11 to 01.

The changes in the electrical condition of the various units in the chain where the number of impulses in the first series is 4, 5, 6 or 7, can be easily followed in Figs. 6 and 7; and it is again remarked that when the first digit of the two-digit number characterizing the condition of unit C is 0 (absence of ground at the output) a non-significant modification in the electrical condition of unit D will occur after make contact $mf_4$ has closed.

Just as the provision of one auxiliary impulse by means of relay M*er* for $T=4$, 5, 6 or 7 produced a correction of +1 in unit D of the chain, relay M*er* will supply two auxiliary impulses to unit D to achieve a correction of +1 in unit E in the case of $T=8$, 9 or 0. This will result from the fact that for $T=8$, 9 or 0, all the relays M*ar*—M*dr* are in the released condition, as indicated in Fig. 7. Accordingly, as soon as ground is supplied via make contact $lc_2$ after the reception of the first series of impulses, relay M*er* will energize via break contacts $mf_1$ and $ma_2$ but will release as soon as relay M*ar* is energized via its right-hand winding and opens contact $ma_2$. The energization of this relay will, however, cause the energization of relay M*br* via make contact $ma_1$ and accordingly relay M*er* will again energize but this time via break contact $mf_1$, make contact $mb_2$, break contact $mc_3$ and make contact $mb_1$. The energization of relay M*br* causes the energization of relay M*cr* by means of its right-hand winding and via make contact $mb_1$, whereupon relay M*cr* will lock at contact $mc_2$ and relay M*er* will again release when contact $mc_3$ opens; it will be seen that in this manner two impulses will be supplied to the input of unit D by means of contact $me_1$. Relay M*fr* operates and locks in the same manner as previously described as soon as relay M*cr* is energized. For $T=8$, 9 or 0, the various operations can easily be followed in Fig. 7 and it will be seen that in each case a number will be recorded in the inverted binary scale, which after correction is equal to ten times the number of impulses in the first series.

It will be evident that as soon as these operations have been completed, the chain is in its proper condition to receive the second series of impulses from make contact $is_1$ and via make contact $mf_5$. The conditions of the relays M*ar*—M*dr* are now totally immaterial since the auxiliary impulse relay M*er* can no longer be energized by reason of the open contact $mf_1$.

The first break in the second series of impulses will cause the re-energization of relay L*mr* via break contact $is_1$ and make contact $lb_2$, whereupon ground will be supplied to one end of the winding of relay L*dr* via make contact $lm_1$ and make contact $lc_3$. Accordingly, this relay will operate and will be provided with a holding circuit via its make contact $ld_1$ and the winding of relay E*tr* which, however, cannot operate at this moment since it is short-circuited by the ground supplied via make contact $lm_1$.

With reference now to Fig. 8, the recording of the second series of impulses can easily be followed since this has been indicated for all possible cases in the schematic manner previously used. It is to be noted, however, that in the table in Fig. 8, in which the first column of which (T) relates to the number of impulses in the first series (tens digit), while the second column (U) relates to the number of impulses in the second series (units digit), only the significant changes in the condition of the unit A have been indicated, i. e. changes resulting from the re-energization of relay I*sr* at the end of each received impulse. For example, assuming that the number of impulses in the first series is 4, while the number of impulses in the second series is 5, this will first of all be recorded after the first series of impulses by 1010111 (reading from right to left) corresponding to 40 in an inverted binary notation and the five impulses in the second series will cause modification in the conditions of units A, B, C and D, bringing them respectively from 10 to 01, 10 to 11, 10 to 01 and 01 to 00 and thereby the final recording in an inverted binary scale to 1010010 (reading from right to left) corresponding to 45, the decimal number represented by the received impulses.

It will be observed, from a scrutiny of the first, second and last columns of Fig. 8, that the number finally recorded in the chain at the end of the reception of two series of impulses, of which the first series represents a digit in the denomination $10^1$ of a decimal number and the second a digit in the denomination $10^0$, is in all cases strictly in accordance with the number of impulses in said two series, the number of impulses in the first series having been duly multiplied by ten. However, owing to the fact already mentioned that the digit 0 is conventionally characterized by 10 impulses, rather than by no impulses, it follows that the received number 20, for example, is recorded as a number which is the inverted binary equivalent of 30, that is $2\times10+10$; similarly, the received number 02 is recorded as a number which is the equivalent of 102, that is $10\times10+2$. This apparent anomaly will be recognized by those skilled in the art as well known in telephone practice and of no serious consequence therein. It will also be evident to one skilled in the art that, should the need arise, it is possible, by employing methods of circuitry analogous to the method described herein of feeding auxiliary corrective impulses into the recording chain after the reception of a series of impulses, to arrange that the number finally recorded is in all cases strictly the inverted binary equivalent of the decimal number represented conventionally by the series of impulses received.

Relay L*mr* will again release when relay I*sr* re-energizes for a longer period after the second series of impulses has been received, whereupon relay E*tr*, being no longer short-circuited by the ground previously supplied via contact $lm_1$, will energize in series with relay L*dr* via make contact $ld_1$ and will now extend the characteristic conditions of the units A—G to the conductors 1—7 via make contacts $et_1$—$et_7$. For the last conductor i. e. 7, it may be noted that the electrical condition of unit G is in fact shown to be supplied by contact $md_1$ of relay M*dr*, the electrical condition of which is, of course, directly dependent upon the electrical condition of unit G.

The release of the circuit will occur in the following manner: when relay I*sr* is released for a substantial period, it will cause the release of relay L*br*, whereupon relays L*hr* and L*cr* will also release. The release of the relays in the various units should generally be dependent upon the proper actuation of the device controlled by the record stored in the units, e. g. upon the successful setting of a telephone switch operating on a binary basis; and means to control the release in such a manner has been schematically indicated by contact *k* supplying battery potential to the various units. This contact will, of course, be generally a relay contact, said relay being operable in any suitable manner obvious to those skilled in the art. As shown in Fig. 3, the interruption of battery potential at contact *k* will also cause the release of relay M*fr*, L*dr*, E*tr*, M*ar*, M*br* and M*cr*, together with relay M*dr*, if this relay has remained operated after recording.

It will be readily appreciated that while the embodiments of the invention described herein have been been in relation to series of impulses representing a number in the decimal scale, this fact should by no means be considered as a restriction thereof the original number N which is characterized by the impulses received might be in any aribtrary scale $s$ or even in a complex scale. Further, it is evident from the manner in which the first of two series of impulses was recorded by the circuit of Fig. 3, that the invention is not limited to the recording (in the binary scale) of one or two series of impulses; it might also be applicable to the recording of any number of series of impulses since in the case of a plurality $t$ of series of impulses $N_1$, $N_2$, . . . $N_x$, . . . $N_t$ (where $1 \leqslant x \leqslant t$) characterizing the number $$N(N = N_1 s^{t-1} + N_2 s^{t-2} + \ldots + N_x s^{t-x} + \ldots + Nt$$

$s$ being therefore the original scale of the number N and $t$ being the number of digits in said scale $s$), each series of impulses such as $N_x$ can be simultaneously applied to one or more units in the chain, the position of these units being determined in accordance with the exponents of the powers of 2, the sum of which powers of 2 is equal to $s^{t-x}$. Further, the number of units ($n$) to be provided can always be the minimum number required to record the highest final binary number to be used, and can therefore be determined by the relation $$2^{n-1} < \frac{s(s^t - 1)}{s-1} \leqq 2^n$$

since instead of providing additional units for a correct recording of the impulses in all the series but the last, auxiliary impulse means, e. g. relay M*er* (Fig. 3), can be provided to supply a suitable number of corrective impulses at a suitable point or points in the chain, the number of auxiliary impulses being determined by the binary number temporarily recorded on the chain which will cause said suitable number of corrective impulses to be applied by any means known in the art, e. g. relays M*ar*—M*dr* (Fig. 3) so as to bring the recorded binary number to its proper value $$N_1 s^{t-1} + N_2 s^{t-2} + \ldots + N_x s^{t-x}$$

after the series of impulses $N_x$ has been received.

This method of using auxiliary impulses is to be preferred to the provision of additional recording units since "static" means would then have to be provided to add the numbers recorded on the auxiliary units to those of the main chain. "Static" means is used here in contradistinction to impulse means and such static means involve a large number of cross connections between the units and are therefore complicated. On the other hand, it will be observed that practically all the relays included in the arrangements described above have a very limited number of contacts, more particularly the relays included in the various recording units and therefore fast operation can be obtained. For this reason, the feeding of auxiliary impulses during the periods occurring between series of received impulses is no objection, especially in view of the fact maximum number of these auxiliary impulses is somewhat limited, e. g. two for the circuit of Fig. 3.

For use in relation to any telephone system using switches operating on a binary basis, the arrangement described is particularly effective in view of the direct recording of series of impulses in the binary scale, whereby the switch which is to be controlled can be set with a minimum of delay. It is evident that the register-translator arrangement described can be incorporated at any suitable place in a telephone system, e. g. in the register-sender. Further, the electric recording units used exclusively include relays with a very limited number of contact pairs, i. e. two, thereby ensuring speedy response, and minimizing the possibility of faulty reception of impulses from fast dial-senders.

Also, although the embodiments described herein are of the electro-magnetic type, it is evident that the invention is not restricted to such embodiments and electronic means could also be used in accordance with the principles of the invention.

While the principles of the invention have been described herein in connection with specific apparatus, it is to be clearly understood that this description is made only by way of example and not as a limitation on the scope of the invention.

I claim:

1. An electric device for recording, in a binary scale of notation, a number represented in another scale of notation by a plurality of digits, comprising in combination a line over which said number is delivered to said device in the form of a plurality of series of current impulses, each series corresponding to one of said digits, a plurality of electric units, each arranged as a repetition-rate halver and comprising a first relay having an operating winding, a second relay having an operating winding and a holding winding, an input lead, and output lead, means for connecting the operating windings of both relays and a break contact of said second relay in series with said input lead, means including a make contact of said first relay for connecting said operating windings of both said relays in series with said holding winding of said second relay, means including a make contact of said second relay for connecting the operating winding of said second relay in series with said input lead, and means including a make contact of said first relay for completing the circuit of said output lead, said units being assembled in a chain with the output lead of one unit connected to the input lead of the succeeding unit, and means connected to said line for transmitting the impulses of each of said series, except the series corresponding to the digit of lowest denomination, simultaneously to the input leads of more than one of said units, whereby a binary number is recorded upon said chain of units.

2. An electric device for recording a number in the binary scale of notation represented in the decimal scale of notation by tens and units digits, comprising in combination a line over which said number is delivered to said device in the form of two series of current impulses corresponding respectively to said tens and units digits and in that order, a plurality of electric units, each arranged as a repetition-rate halver, and having an input lead and and output lead, and comprising two electro-magnetic relays, each provided with two mating pairs of contacts, said relays being arranged to operate in succession at the beginning and end, respectively, of a first current impulse delivered to the input lead of said unit and to release in succession, and in the same order, at the beginning and end, respectively, of a second current impulse delivered to the said input lead, one of the contacts of said relays being connected to the output lead of said unit, said electric units being assembled in a chain with the output lead of one unit connected to the input lead of the succeeding unit, means connected to said line for transmitting said series of impulses, means for directing the impulses of the series corresponding to said tens digit simultaneously to the input leads of the second and fourth units of said chain, counted from the input end thereof, and means for directing the impulses of the series corresponding to said units digit to the input lead of the first unit only of said chain.

3. An electric device for recording a number in the binary scale of notation which is represented in the decimal scale of notation by tens and units digits comprising, in combination, a line over which said number is delivered to said device in the form of two series of current impulses corresponding respectively to said tens and units digits and in that order, a plurality of electric units, each arranged as a repetition-rate halver and having an input lead and an output lead, said electric units being assembled in a chain with the output lead of one unit connected to the input lead of the succeeding unit, means connected to said line for transmitting said series of impulses, means for directing the impulses of the series corresponding to said tens digit simultaneously to the input leads of the second and fourth units of said chain, counted from the input end thereof, means for directing the impulse of the series corresponding to said units digit to the input lead of the first unit only of said chain, and means, associated with said directing means for disabling the output of the third unit of said chain during the transmission of the impulses of the series corresponding to said tens digit to the input lead of said fourth unit.

4. An electric device, as claimed in claim 3 and further comprising auxiliary impulsing means, governed by the electrical condition of said chain at the end of said transmission, for delivering at least one auxiliary impulse to said chain, whereby, at the end of the transmission of the impulses of the series corresponding to said units digit, the binary number recorded upon said chain is the binary equivalent of said first-mentioned number.

References Cited in the file of this patent

UNITED STATES PATENTS

| | | |
|---|---|---|
| 1,751,263 | Cesareo | Mar. 18, 1930 |
| 2,310,105 | Michel | Feb. 2, 1943 |
| 2,520,170 | Ransom | Aug. 29, 1950 |
| 2,616,958 | Westerveld | Nov. 4, 1952 |